United States Patent Office 3,036,612
Patented May 29, 1962

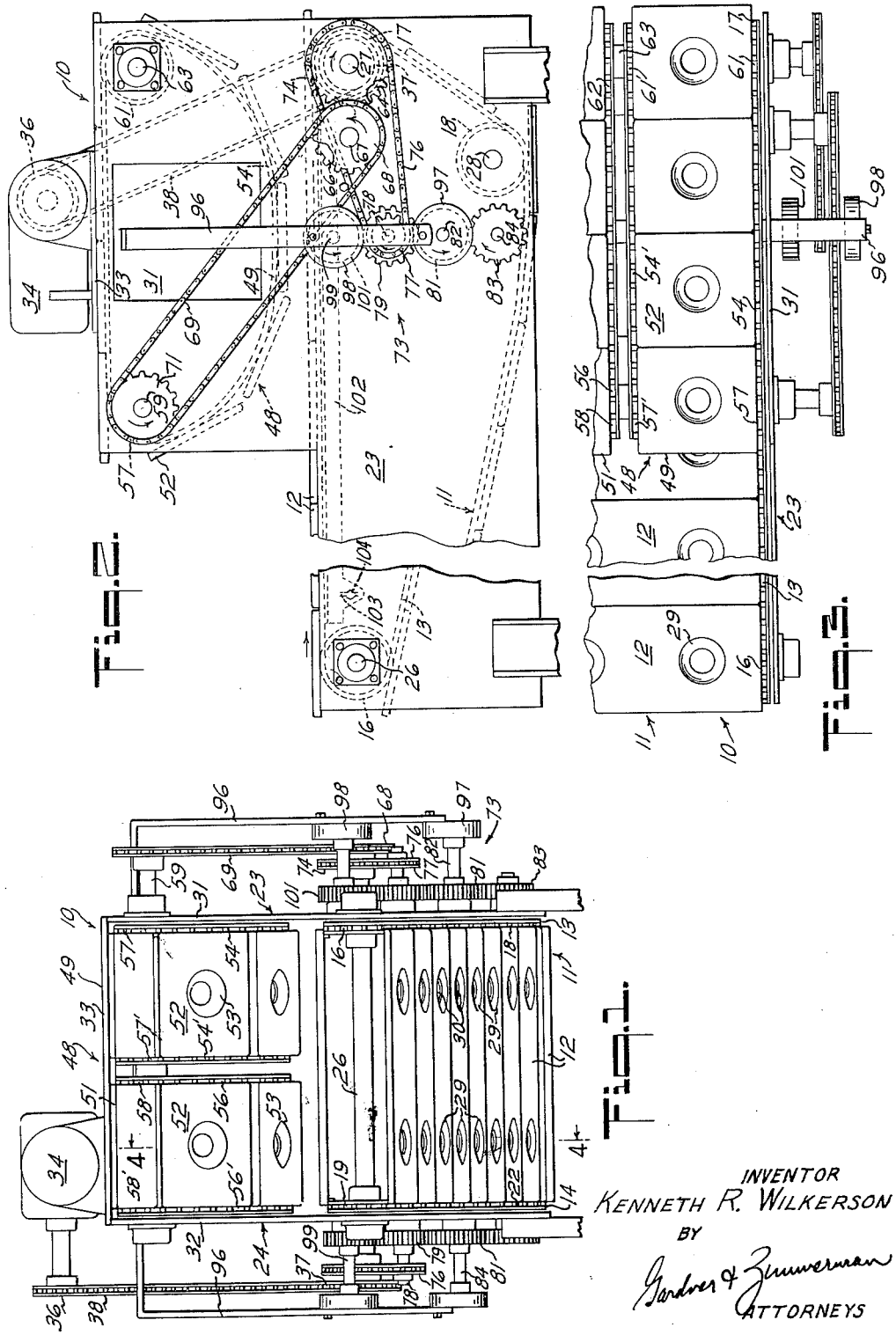

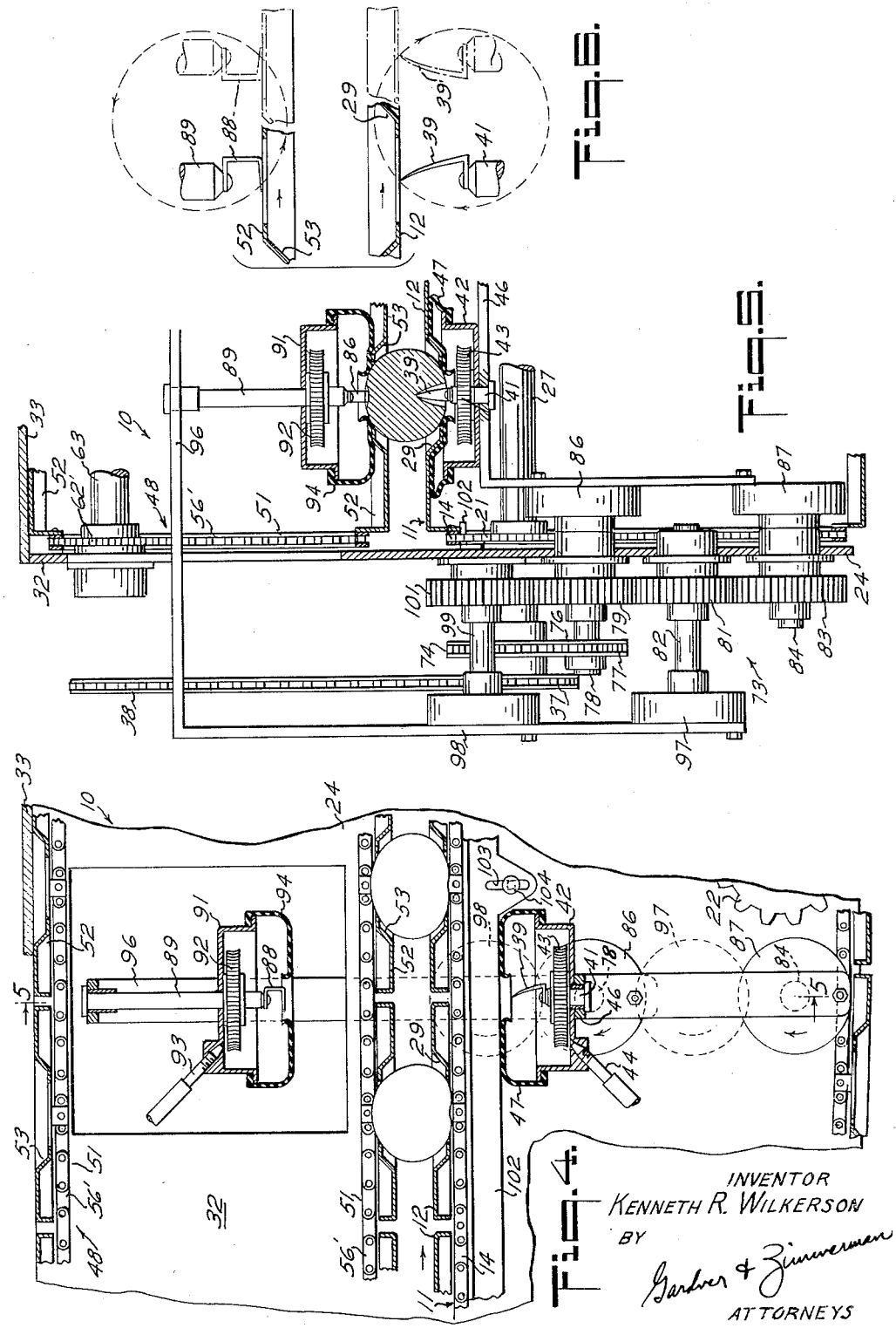

3,036,612
TOMATO CORING MACHINE
Kenneth R. Wilkerson, 3930 Franklin Canyon Road,
Martinez, Calif., assignor of one-half to Sidney Ross,
Walnut Creek, Calif.
Filed June 22, 1959, Ser. No. 822,141
7 Claims. (Cl. 146—52)

The present invention relates generally to food process apparatus and is particularly directed to process apparatus for automatically coring tomatoes and various other produce.

In the food canning industry, it is desirable that as many of the steps as possible in the preparation of vegetables and fruit for canning be conducted in substantially automatic fashion. Accordingly a multitude of processing equipments are employed in canneries and the like to automatically advance the food raw material to the canned end product with a minimum of hand labor. Various steps in certain food preparing processes, however, are still conducted in large part by hand, by virtue of the difficulties encountered in adapting these steps to automatic processing. In the canning of tomtaoes, or similar vegetables and fruits, for example, the coring of such products has long been accomplished by hand. Usually, the tomato or other product is manually positioned into engagement with a rotating coring knife to effect removal of the core. Such manual coring operation, aside from being costly from the labor standpoint, is also undesirable because of the personnel hazards associated therewith. Despite the apparent advantages which would be gained by automation of the coring operation, suitable apparatus for this purpose has not been available. Inasmuch as the tomatoes or the like are necessarily fed into food processing apparatus by means of a conveyor system, formidable problems have been heretofore posed in the design of apparatus which will automatically effect coring in a manner comparable to that effected when the tomato is stationary relative to the position of a rotary coring knife. For example, if the rotating coring knife were stationary with respect to a moving conveyor, portions of the tomato in addition to the core would be thereby wastefully and uneconomically removed.

The present invention overcomes the foregoing problems and disadvantages by providing automatic coring apparatus wherein the tomatoes, or other fruit or vegetable, are cored during their translational conveyance with no relative movement between the tomato and the rotating coring knife. The cores of the tomatoes or the like, are hence automatically remove with an extreme minimum of elimination of the useful portions of same. The coring apparatus of the present invention in addition may be advantageously employed to simultaneously remove the undesirable brown spot which inherently appears at the bottom of a tomato opposite the stem.

It is therefore an object of the present invention to provide an automatic coring apparatus for removing the stem or core portions of tomatoes or other vegetables or fruits continuously fed thereinto upon a conveyor or the like and in which such coring is effected without halting the movement thereof through the apparatus.

Another object of this invention is the provision of apparatus of the class described wherein the coring operation is effected with a minimum of waste of the useful portions of the vegetable or fruit.

Still another object of the present invention is to provide fruit or vegetable coring process machinery wherein the rotating coring knives move at the same forward rate of speed as the conveyor during the coring operation and are arranged to move into and out of engagement with the product during such forward movement thereof.

It is another object of the present invention to provide tomato processing equipment for automatically removing the core and brown spot at the opposite side thereof simultaneously.

One other object of the invention is to provide automatic coring apparatus fed by the plural row conveyor and capable of accommodating different sized vegetables or fruits in the conveyor rows.

A further object of the invention is to provide automatic coring apparatus wherein the depth of cut of the coring knives is adjustable.

The invention possesses other objects and features of advantage, some of which, with the foregoing, will be set forth in the following description of the preferred form of the invention which is illustrated in the drawings accompanying and forming part of the specification. It is to be understood, however, that the variations in the showing made by the said drawings and description may be adopted within the scope of the invention as set forth in the claims.

FIGURE 1 is a front elevational view of a preferred embodiment of automatic coring apparatus in accordance with the present invention.

FIGURE 2 is side elevational view of this embodiment with portions broken away.

FIGURE 3 is a partial plan view thereof.

FIGURE 4 is an enlarged cross-sectional view taken on line 4—4 of FIGURE 1.

FIGURE 5 is a transverse cross-sectional view taken on line 5—5 of FIGURE 4 but illustrating the apparatus in a coring position.

FIGURE 6 is a diagrammatic view similar to FIGURE 4 showing the movement of the coring knives in detail.

Referring now to the drawings, there is seen to be provided automatic coring apparatus 10 here shown as particularly embodied for employment with tomatoes; however, it is to be appreciated that the invention may be similarly employed with other produce as well. In order to maintain a continuous large volume flow of tomatoes into the apparatus, the same includes a lower conveyor 11 which is preferably arranged to accommodate at least two rows of tomatoes side by side. More particularly, the conveyor 11 preferably comprises a plurality of horizontal plates 12 connected transversely between a pair of continuous chains 13 and 14 along the entire lengths thereof. The chain 13 is engaged by end sprocket wheels 16 and 17 and an intermediate sprocket wheel 18, the latter being displaced downwardly relative to the end sprocket wheels. Chain 14 is engaged by similar sprocket wheels 19, 21 and 22, and the respective wheels are positioned adjacent the outer surfaces of transversely spaced rigidly interconnected side plates 23 and 24. The sprocket wheels 16 and 19, 17 and 21, and 18 and 22 at corresponding positions of the opposite side plates are respectively interconnected by transverse shafts 26, 27, and 28 whereby the two chains are adapted for synchronous movement.

Each conveyor plate 12 is shown in the drawings as including a pair of transversely spaced generally conical tomato receiving pockets 29 each having a bottom central aperture 30, although, as indicated hereinbefore, more pockets may be formed in each plate in the event more than two conveyor rows are desired.

The side plates 23 and 24 include upwardly stepped portions 31 and 32 at their forward ends and a top plate 33 is rigidly attached transversely between the upper edges thereof. Supported on the plate 33 there is a conveyor driving motor 34 having a sprocket wheel 36 rigidly attached to the shaft thereof. Sprocket wheel 36 is connected in driving relation to a sprocket wheel 37 secured to shaft 27 by means of a drive chain 38. The driving motor 34 hence pulls the conveyor drive chains 13 and 14 by virtue of the chain drive to shaft 27. The ratios between the number of sprockets on the various sprocket wheels and links on the various chains may be of any convenient value, however, it has been found particularly advantageous in practice to employ ratios such that for each revolution of sprocket wheel 37 the conveyor is pulled two pockets of travel. With the conveyor thus driven continuously forward and provided with two rows of pockets 29, personnel may be stationed on opposite sides of the conveyor at the rearward end of side plates 23 and 24 to place tomatoes in the conveyor pockets as they pass the stations, a continuous large volume flow of tomatoes being thus conveyed forwardly into the coring apparatus. The tomatoes are placed in the pockets with their stem or top sides down for purposes subsequently described.

In order to effect automatic coring of the tomatoes as they are conveyed through the apparatus, rotary coring knife means are disposed between the side plates 23 and 24 for each row of conveyor pockets 29, preferably at transversely aligned positions at the mid-length of stepped portions 31 and 32. More specifically, each coring knife means, as best shown in FIGURES 4 and 5, preferably comprises an upright arcuate coring knife 39 of conventional configuration disposed beneath the conveyor plates 12 so as to intersect in coring relation the core portions of the tomatoes overlying the aperture 30 at the bottoms of pockets 29. Each knife 39 is rigidly secured to the end of a vertical shaft 41 journalled centrally of a cylindrical cup shaped open top housing 42. Means are provided for rotating the shaft 41, and as here shown, a vaned member 43 is rigidly secured to the shaft whereby a jet of water or the like directed thereon from a nozzle 44 communicating interiorly of the housing 42 will effect shaft rotation. The knives 39 are hence rotated about vertical axes intersecting the tomatoes positioned within pockets 29. Each housing 42 is rigidly secured to a common inverted U-shaped cam arm 46 mounted and operated in a novel manner subsequently described so as to move the rotating coring knives 39 upwardly through the apertures 30 and into engagement with the core portions of the tomatoes at the instant the latter are conveyed over the knife position. Each knife hence cuts a substantially conical shaped wedge including the core portion from the corresponding tomatoes.

To facilitate close engagement between the knife housings 42 and the undersides of the conveyor plates 12 during upward travel of the housing into coring position there is provided a member 47 secured to and extending across the upper open end of the housing. Member 47 is formed of soft rubber or the like and is of inverted cup-shaped configuration with the upper surface thereof provided with a central aperture 50 for permitting passage of knife 39 therethrough. The normal cup shape of the member, as depicted in FIGURE 4, is deformed into conformation with the underside of the pockets 29 in the conveyor plates 12, as depicted in FIGURE 5 at the upper vertical position of the housing 42 so to establish close engagement therebetween with the knife 39 protruding vertically through the aperture 50.

It will be appreciated that by virtue of the upward movement of the knives 39 into cutting engagement with the tomatoes, there is a severe tendency for the tomatoes to be urged upwardly and out of the pockets 29. Such difficulty is overcome in the apparatus of the present invention by means of an upper conveyor 48 for retaining the tomatoes in fixed vertical position within pockets 29 during the coring operation. More particularly, referring again to FIGURES 1 and 2, the upper conveyor 48 is advantageously provided as a plurality of separate transversely aligned continuous belts 49 and 51 of conveyor plates 52 similar to plates 12 with the number of belts corresponding to the number of rows of pockets 29 in the lower conveyor plates. The plates 52 of each belt respectively include one product-receiving pocket 53 formed centrally of the plate with each pocket having a central aperture 55. The plates of the respective belts 49 and 51 are transversely secured between similar chains 54 and 54' and 56 and 56' positioned on opposite sides of the plates and which engage a plurality of sprocket wheels 57 and 57' and 58 and 58' transversely ganged by a shaft 59 journalled between the upwardly stepped portions of side plates 23 and 24 in the upper rearward regions thereof and a plurality of sprocket wheels 61 and 61' and 62 and 62' transversely ganged by shaft 63 similarly journalled in the upper forward regions of the side plate stepped portions. The plates 52 of the respective belts 49 and 51 are disposed moreover such that the pockets 53 thereof correspond in transverse relation to the rows of pockets 29 of the lower conveyor plates 12. The belts, moreover, are of such a length that sufficient slack is provided for the plates 52 to be suspended beneath the sprocket wheels into closely spaced relation with the plates 12 of the lower conveyor at substantially the midlength of the stepped portions of side plates 23 and 24. The direction and rate of travel of the upper conveyor belts may be appropriately synchronized such that the pockets 53 are in direct vertical registry with the pockets 29 during the coring operation and the upper conveyor pockets 53 engage the tomatoes to retain same vertically within the lower conveyor pockets 29. It is particularly important to note that by virtue of the separate belts employed in the upper conveyor to respectively correspond to the rows of pockets in the lower conveyor, different size tomatoes may be placed side by side in the rows of pockets of the lower conveyor and yet be effectively, simultaneously, and separately vertically retained in the lower conveyor pockets, which action could not be effected by a transversely singular longitudinal succession of upper conveyor plates having transversely spaced rows of pockets therein.

To approximately synchronously drive the upper conveyor with respect to the lower conveyor in accordance with the considerations noted hereinbefore, lower conveyor drive shaft 27 carries a spur gear 64 for engaging a spur gear 66 keyed to shaft 67 which is journalled to the side plates 23 and 24 proximate shaft 27. A sprocket wheel 68 is in turn secured to shaft 67 and is coupled by means of a drive chain 69 to another sprocket wheel 71 secured to the upper conveyor drive shaft 59. By virtue of the gear drive between the shafts 27 and 67, the sense of rotation transmitted to upper conveyor drive shaft 59 is reversed relative to that of the lower conveyor drive shaft 27. Hence, the lower portions of the upper conveyor belts 49 and 51 move in the same forward direction as the lower conveyor. By suitable selection of gear ratio and relative numbers of sprockets and links in the chain drive, moreover, the forward translational velocity of the upper conveyor plates 52 can be made identical to that of the lower conveyor plates 12. By suitable initial relative positioning of the upper and lower conveyor plates, the pockets 53 and 12 thereof are thus thereafter maintained in step and are translated over the coring knives 39 in direct vertical opposition.

It will be appreciated that in order for the tomatoes as conveyed longitudinally over the cutting knives 39 and retained in substantially fixed vertical position between the lower and upper conveyors to be efficiently cored with a minimum of waste of usable portions of the tomatoes, the upward excursion of the cutting knives must be synchronized to the forward displacement of the conveyors such that the maximum vertical reach of the knives occurs precisely at the instant the center of a pocket 29 is coaxial with rotating knife shaft 41, the core portions of the tomatoes being disposed substantially centrally of the pocket openings. If the vertical excursion of the knives were direct upward thrusts, moreover, the longitudinal movement of the tomatoes relative to the fixed longitudinal position of the knife would result in a tearing action across the entire exposed portions of the tomato, thus wastefully removing a substantial usable portion of the tomato in addition to the core. In accordance with the present invention, such difficulties are overcome by providing for a vertical upward thrust movement of the coring knives combined with a longitudinal forward movement thereof during the coring operation at the same rate of forward travel as the conveyor and synchronized therewith. The longitudinal position of the tomatoes is hence fixed relative to the coring knives during the time the tomato is penetrated by same whereby very little more than the tomato core is removed.

To facilitate the foregoing, the lower conveyor drive shaft 27 is coupled in driving relation to gear and cam drives 73 at opposite sides of the apparatus and which are respectively connected to the parallel side portions of cam arm 46 to synchronously effect the necessary combination of vertical and longitudinal motion of the cutting knives 39. The gear and cam drives 73 for the cam arm 46 of the preferred embodiment are identical in all respects.

Hence the ensuing detail description of but one of the drives 73 is similarly applicable to the other one thereof. For each drive 73, a sprocket wheel 74 is secured to lower conveyor drive shaft 27 and coupled by means of a chain 76 to a sprocket wheel 77 secured to shaft 78 of the gear and cam drive 73. As best shown in FIGURE 5, the shaft 78 is transversely journalled to one of the side plates 24 at the midlength of stepped portion 32 with the sprocket wheel 77 outwardly adjacent the plate and the shaft extending therethrough. A spur gear 79 is also secured to shaft 78 intermediate sprocket wheel 77 and side plate 24. Gear 79 engages an identical spur gear 81 carried upon a transverse shaft 82 which is journalled transversely to side plate 24 at a vertically downwardly displaced position relative to shaft 78. A third identical spur gear 83 in engagement with gear 81 is secured to a shaft 84 journalled transversely to the side plate and extending therethrough at a downwardly aligned position relative to shaft 82. Shafts 78 and 84 hence rotate at the same speeds and in the same directions by virtue of the identical gears 79, 81, and 83, coupling same. A pair of like cams 86 and 87 are centrally secured to the inner extremities of shafts 78 and 84 and the cam arm 46 is eccentrically pivotally connected to the cams at like positions thereof. As the cams rotate synchronously, the eccentrically secured cam arm 46 and the point of each coring knife 39 mounted thereon hence describe an arcuate substantially circular path in a longitudinal plane passing through the center of the apertures in the conveyor pockets 29 as diagrammatically illustrated by the arrows in FIGURE 6. The point of the coring knife 39 thus moves arcuately upward to penetrate the portion of a tomato exposed through the plate aperture and then arcuately forward as the tomato is moved forward by the conveyor. The knife is thereafter moved arcuately downward out of penetration with the tomato as it is forwardly translated beyond the position of the knife. The circular excursion path of the knife 39 is effected once each revolution of the cams 86 and 87 and moreover by appropriate selection of the cam major and minor diameters and the gear and sprocket ratios of the drives 73, the rate of forward longitudinal travel of the knife from the point of entering to point of departing intersection with the plane of the pocket aperture is made equal to the rate of forward translation of the conveyor. Hence the knife is stationary with respect to a tomato in a conveyor pocket 29 during the coring operation (other than for rotation about a vertical axis) and therefore a relatively small conical section including the core portion is removed, the extent of removal being determined by the displacement of the cutting knife base from the axis of shaft 41. With a rate of two conveyor pockets of forward displacement effected by lower conveyor drive shaft 27, for example, a 2 to 1 ratio between the sprocket wheels 74 and 77 is indicated in order that the cams 86 and 87 make two revolutions to each revolution of the lower conveyor drive shaft 27 and therefore effect two complete excursions of the coring knife 39 for two pockets of displacement by the conveyor.

In the tomato canning industry, it is also desirable that inherent brown spots appearing at the opposite face of the tomato from the stem be removed. The present invention therefore provides means arranged to act in unison with the coring action to simultaneously strip the brown spots from the tomatoes. Such means preferably includes a rotary horizontal skinning knife 88 for each of the rows of the conveyor. Each skinning knife 88 is disposed between the stepped portions 29 and 31 of side plates 23 and 24 above the lower portions of the upper conveyor 48 in direct opposed relation to each of the coring knives 39. Each knife 88 is secured to a vertical shaft 89 journalled centrally of an inverted cup-shaped housing 91. In addition, a circular vaned member 92 is coaxially secured to shaft 89 within the housing and effects rotation of the skinning blade in response to a jet stream of water or the like directed thereon from a nozzle 93 which communicates interiorly with the housing. In similar fashion to the coring knife housing 42, a centrally apertured cup-shaped lightening or cushioning member 94 of flexible material such as soft rubber is secured to the open end of housing 91. The entire housing 91 is dependently rigidly secured to a U-shaped cam arm 96 which extends transversely between the side plates 23 and 24 with the vertical legs thereof extending downward in external parallelism with the respective ones thereof. The cam arm 96 is mounted in a manner subsequently described to effect downward and forward arcuate motion of the skinning knives 88 simultaneously with the upward and forward arcuate motion of the coring knives 39. The rotating skinning knives 88 hence slice a thin substantially flat circular skin portion, including the undesirable brown spot, from the portion of a tomato exposed through the aperture 55 of the upper conveyor pocket 53 at the same time as the stem portion is cored from the opposite side of the tomato by the coring knife 39. The circular motion of the skinning knives 88 moreover is arranged to provide forward travel of the knife at the same rate of forward translation of the conveyors during the slicing operation such that the skinning knives 88 are longitudinally fixed relative to the moving conveyors.

To effect the necessary circular motion of the skinning knives 88 with a synchronous opposed sense of rotation to the similar motion of the coring knives 39 as diagrammatically depicted by the arrows in FIGURE 6, the parallel vertical legs of the cam arm 96 are each pivotally secured eccentrically at like positions of circular cams 97 and 98 of drives 73 identical to cams 86 and 87. Cam 97 is rigidly centrally attached to the end of shaft 82 whereas the cam 98 is similarly attached to the end of a transverse shaft 99 journalled to side plate 24 at a position of upward vertical displacement from shaft 78. Shaft 99 carries a spur gear 101 identical to the spur gear 79 carried by shaft 78 and in engagement therewith. By virtue of the direct gear coupling, the cams 97 and 98 are rotated with the same sense of rotation opposite to that of cams 86 and 87. The cam arm 96 is hence synchronously moved in rotational opposition to cam arm 46 whereby the skinning knives 88 are moved arcuately downward and forward synchronously as the coring knives 39 are moved arcuately upward and forward. The slicing and coring operations are hence effected simultaneously and with no relative longitudinal movement between the knives 88 and 39 and the tomatoes as carried longitudinally forward by the conveyors.

Provision is also made in the apparatus of the present invention for the ready adjustment of the depth of cut of the coring knives 39. A pair of angle members 102 are respectively secured to side plates 23 and 24 at their upper edges and extend along the entire lengths thereof.

The vertical leg of each angle member is disposed in juxtaposition with the inner face of the corresponding side plate and the horizontal leg of the angle projects transversely inward therefrom. The chains 13 and 14 of the lower conveyor are hence slidably supported upon the horizontal legs of the angle members 102. The vertical leg of each member is vertically slotted as shown generally at 103 and bolts 104 extending through each slot and through the side plate facilitate securance of the angle member thereto. The vertical position of the angle members 102 may thus be readily adjusted and the lower conveyor thereby raised or lowered with respect to the coring knives 39. The conveyor pockets 29 may hence be adjusted closer to or further from the upper reach of the coring knives thereby varying the depth of cut of same.

There is thus provided by the present invention apparatus whereby a large volume of flow of tomatoes or the like as fed into the apparatus upon a conveyor are simultaneously cored and the brown spots sliced therefrom automatically. By virtue of the novel substantially circular excursion of the cutting and slicing knives 39 and 88 as effected by the cams 86 and 87 and 97 and 98 and the sprocket-gear drives 73 driving same synchronously with the conveyor pockets 29, the coring and cutting operations are made to occur with no relative longitudinal movement between the knives and tomatoes. The cutting and coring operations are hence effected as if the tomatoes were stationary and with a minimum of waste.

What is claimed is:

1. Automatic coring apparatus for tomatoes and the like comprising a pair of transversely spaced rigidly interconnected side plates, a continuous loop conveyor having a plurality of plates connected transversely between parallel drive chains at longitudinally spaced intervals along their length, said plates each having a plurality of transversely spaced centrally apertured tomato receiving pockets formed in the outside face thereof, a sprocket wheel drive carried by said side plates and engaging the chains of said conveyor to pull same longitudinally forward along the upper edges of the side plates at a constant rate of travel, a second loop conveyor having a plurality of plates connected transversely between parallel drive chains at longitudinally spaced intervals along their length, said plates having a plurality of centrally apertured pockets formed in the outside faces thereof corresponding to the pockets of the plates of said first conveyor, a pair of side plate extensions extending upward from the top edges of said side plates, a sprocket wheel drive carried by said side plate extensions and engaging the chains of said second conveyor to suspend the lower portion thereof in vertically spaced opposing relation to the upper portion of said first conveyor, a sprocket wheel chain drive connecting the sprocket wheel drives of said first and second conveyors to pull said second conveyor at the same rate of travel as said first conveyor in opposite rotational sense thereto and in synchronism therewith to register the pockets of the respective conveyors at an intermediate location relative to the ends of said side plate extensions, a plurality of transversely spaced vertical shafts disposed between said side plates at said intermediate location and beneath the longitudinally forward travelling portion of said first conveyor in respective longitudinal planes intersecting the lines of centers of the rows of pockets therein, arcuate coring knives secured to the ends of said shafts, means coupled to said shafts for continuously rotating same about their axes, an inverted U-shaped cam arm disposed with the side sections thereof parallel to said side plates and the interconnecting top section extending transversely therebetween and secured to said shafts, a pair of vertically spaced substantially circular cams journalled to each of said side members with the corresponding side section of said cam arm eccentrically secured at like positions of the cams, a pair of like gears respectively shaft connected to the cams of each pair thereof, a third like gear journalled to each side plate vertically intermediate the gears of each pair and simultaneously engaging same, and a sprocket wheel chain drive connected between said sprocket wheel drive and the shaft of one of the gears of each pair to effect rotation thereof at a synchronous rate relative to the rate of travel of said conveyor.

2. Automatic coring apparatus as defined by claim 1 further defined by said second conveyor being formed as a plurality of transversely spaced belts corresponding to the plurality of rows of pockets in said first conveyor with each belt having a plurality of longitudinally spaced plates transversely secured between parallel drive chains and each plate having a single centrally apertured pocket formed in its outside face.

3. Automatic coring apparatus as defined by claim 1 further defined by a pair of angle members secured to the top edges of said side plates with the vertical legs of the members adjustably slidable relative thereto and the horizontal legs of the members projecting inwardly in supporting relation to the upper portion of said first conveyor.

4. Automatic coring apparatus as defined by claim 1 further defined by a second plurality of transversely spaced vertical shafts disposed between said side plate extensions at said intermediate location and above the lower portion of said second conveyor in respective axial alignment with said first plurality of vertical shafts, horizontal slicing knives secured to the lower ends of said shafts, means coupled to said second plurality of shafts for continuously rotating same about their axes, a second inverted U-shaped cam arm disposed with the side sections thereof parallel to said side plate extensions and the interconnecting top section extending transversely therebetween and secured to said second plurality of shafts, a second pair of vertically spaced substantially circular cams secured at like eccentric positions thereof to each side section of said cam arm, one of the cams of each pair thereof shaft connected to said third gear, and a fourth like gear journalled to each side plate in vertically spaced relation to said first gear and in engagement therewith, said fourth gears respectively shaft connected to the other cams of said second pairs thereof.

5. Automatic coring apparatus for tomatoes and the like comprising a pair of transversely spaced rigidly interconnected side plates having upwardly stepped portions at the forward end thereof, a continuous loop lower conveyor having a plurality of longitudinally spaced plates connected transversely between parallel drive chains, said plates respectively having two transversely spaced centrally apertured pockets in their outside faces and thereby forming two longitudinally extending rows thereof, a sprocket wheel drive carried by said side plates and engaging the chains of said lower conveyor to pull same forward along the upper edges of the side plates at a constant rate of travel, an upper loop conveyor having two transversely spaced pluralities of longitudinally spaced plates respectively connected transversely between first and second pairs of parallel drive chains, each one of said plates having a single centrally apertured pocket formed in its outside face, a sprocket wheel drive carried by the stepped portions of said side plates and engaging the chains of said upper conveyor to suspend the lower portion thereof in vertically spaced opposing relation to the upper portion of said lower conveyor, a sprocket wheel chain drive connecting the drives of said lower and upper conveyors to pull the latter at the same rate of travel as the former in opposite rotational sense thereto and in synchronism therewith to register the pockets of the respective conveyors at an intermediate location relative to the ends of the stepped portions of said side plates, a pair of transversely spaced vertical shafts disposed between said side plates at said intermediate location and beneath the upper portion of said lower conveyor in respective longitudinal planes intersecting the lines of centers of the rows of pockets therein, arcuate coring knives secured to the upper ends of said shafts, a cup shaped housing concentrically enclosing each shaft and secured to the lower end thereof, a centrally apertured inverted cup shaped lightening member secured to in closing relation to the open upper end of each housing, means coupled to said shafts for continuously rotating same about their axes, an inverted U-shaped cam arm disposed with the side sections thereof parallel to said side plates and the interconnecting top section extending transversely therebetween and secured to said housings, a pair of vertically spaced substantially circular cams journalled to each of said side plates with the corresponding side section of said cam arm eccentrically secured at like positions of the cams, a second pair of transversely spaced vertical shafts disposed between the stepped portions of said side plates above the lower portion of said upper conveyor and in respective alignment with said first pair of shafts, horizontal flat skinning knives secured to the lower ends of said second pair of shafts, an inverted cup shaped housing concentrically enclosing each one of said second plurality of shafts and secured to the upper end thereof, a centrally apertured cup shaped lightening member secured in closing relation to the open lower end of each housing, means coupled to said second plurality of shafts and secured to the upper end thereof, a centrally apertured cup shaped lightening member secured in closing relation to the open lower end of each housing, means coupled to said second plurality of shafts for continuously rotating same about their axes, a second inverted U-shaped cam arm disposed with the side sections thereof parallel to the stepped portions of said side plates and the interconnecting top section extending transversely therebetween and secured to said housings enclosing the second pair of shafts, a second pair of vertically spaced substantially circular cams journalled to said side plates with the corresponding side plates with the corresponding side section of said second cam arm eccentrically secured at like positions of the cams, first and second like gears respectively shaft connected to the cams of each of the first pairs thereof, third and fourth gears like said first and second gears respectively shaft connected to the cams of each of the second pairs thereof, said first, second, third, and fourth gears vertically spaced relative to each other and journalled to the side plates with the fourth engaging the first, the first engaging the third, and the third engaging the second gears, and a sprocket wheel chain drive connected between said sprocket wheel drive and the shaft of each of said first gears to effect rotation thereof at a synchronous rate relative to the rate of travel of said conveyors.

6. Automatic coring apparatus for tomatoes and the like comprising a pair of transversely spaced rigidly connected frames, a continuous loop conveyor having a plurality of plates connected transversely between parallel members at longitudinally spaced intervals along their length, said plates each having a plurality of transversely spaced centrally apertured tomato receiving pockets formed in the outside face thereof, drive means carried by said frames and engaging the members of said conveyor to pull same longitudinally forward along the upper edges of the frames at a constant rate of travel, a second loop conveyor having a plurality of plates connected transversely between parallel members at longitudinally spaced intervals along their length, the plates of said second conveyor having a plurality of centrally apertured pockets formed in the outside faces thereof corresponding to the pockets of the plates of said first conveyor, said second conveyor having its lower portion disposed in vertically spaced opposing relation to the upper portion of said first mentioned conveyor, said drive means being operatively connected to the second conveyor to pull said second conveyor at the same rate of travel as said first conveyor in opposite rotational sense thereto and in synchronism therewith to register the pockets of the respective conveyors at an intermediate location relative to the ends of said conveyors, a plurality of transversely spaced vertical shafts disposed between said frames at said intermediate location and beneath the longitudinally forward travelling portion of said first mentioned conveyor in respective longitudinal planes intersecting the lines of centers of the rows of pockets therein, arcuate coring knives secured to the ends of said shafts, means coupled to said shafts for continuously rotating same about their axes, a cam arm secured to each of said shafts, a pair of vertically spaced substantially circular cams journalled to each of said frames with the corresponding end of each said cam arm eccentrically secured at like positions of the cams, and means operatively connected to said drive means and said circular cams to effect rotation of said circular cams at a synchronous rate relative to the rate of travel of said conveyor, whereby said coring knives engage the tomato to remove the core therefrom.

7. Automatic coring apparatus for tomatoes and other produce comprising a frame, two continuous longitudinally extending conveyors each having a plurality of complementary longitudinally disposed spaced central aperture pockets in the outside faces thereof for receiving produce therebetween supported by said frame, said conveyors being disposed one above the other with the upper conveyor having its lower portion disposed in vertically spaced opposing relation to the upper portion of the lower conveyor, drive means for pulling said conveyors longitudinally forward along a path of travel at a constant rate of speed in opposite rotational sense thereto and in synchronism therewith to register complementary pockets of respective conveyors at an intermediate location relative to the ends of said conveyors, vertically disposed knife means positioned adjacent each of said conveyors at said intermediate location for extending into each of said registered apertures to skin and cut the core out of produce received in said complementary pockets, horizontal rotating means for rotating said knife means in a horizontal plane in a circular path of travel about a vertical axis, vertical rotating means including a pair of substantially circular cams journalled to said frame and a cam arm connected to each said cam for rotating said knife means in a vertical plane in a circular path of travel in the same direction as movement of said conveyors and pockets when complementary pockets register at said intermediate location, and synchronizing means operatively connected to said drive means and vertical rotating means to move said knife means into said apertures simultaneously with the registering of said complementary pockets at said intermediate location to skin and core said produce concentrically.

References Cited in the file of this patent

UNITED STATES PATENTS

| | | |
|---|---|---|
| 1,923,712 | Deitz | Aug. 22, 1933 |
| 2,788,037 | Carter | Apr. 9, 1957 |
| 2,822,843 | Morici | Feb. 11, 1958 |